US009169796B2

(12) United States Patent
Petrovic et al.

(10) Patent No.: US 9,169,796 B2
(45) Date of Patent: Oct. 27, 2015

(54) METHOD FOR OPERATING AN INTERNAL COMBUSTION ENGINE WITH A TURBOCHARGER ARRANGEMENT AND CONTROL UNIT FOR AN ENGINE WITH A TURBOCHARGER ARRANGEMENT (71) Applicant: Ford Global Technologies, LLC, Dearborn, MI (US)

(72) Inventors: Simon Petrovic, Aachen (DE); Arno Bartsch, Maastricht (NL); Daniel Roettger, Eynatten (BE); Alain Marie Roger Chevalier, Henri-Chapelle (BE); Michael Marbaix, Haillot (BE)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 13/750,821

(22) Filed: Jan. 25, 2013

(65) Prior Publication Data
US 2013/0211693 A1    Aug. 15, 2013

(30) Foreign Application Priority Data

Feb. 15, 2012  (EP) .................................. 12155511

(51) Int. Cl.
| *F02B 37/013* | (2006.01) |
| *F02B 33/44* | (2006.01) |
| *F02D 43/04* | (2006.01) |
| *F02B 39/16* | (2006.01) |
| *F02D 41/18* | (2006.01) |
| *F02D 41/22* | (2006.01) |

(52) U.S. Cl.
CPC .............. *F02D 43/04* (2013.01); *F02B 37/013* (2013.01); *F02B 37/18* (2013.01); *F02B 39/16* (2013.01);

(Continued)

(58) Field of Classification Search
CPC ... F02D 41/221; F02D 41/222; F02D 41/182; F02D 43/04; F02D 37/013; F02D 37/004; F02D 37/18; F02D 33/003; F02D 2009/0277; F01N 11/002; F02B 39/16; F02B 2039/166; F02B 2039/168
USPC ............ 701/114, 104, 101, 110; 60/598, 612, 60/602, 603, 277; 73/114.37, 114.79, 73/114.33, 114.61, 114.69, 114.76; 123/559.1, 559.2, 560, 562, 564, 690, 123/339.15, 198 D, 198 DB
See application file for complete search history.

(56) References Cited

U.S. PATENT DOCUMENTS 5,447,031 A * 9/1995 Betts et al. ...................... 60/603
5,873,248 A * 2/1999 Houtz .............................. 60/602

(Continued)

FOREIGN PATENT DOCUMENTS

DE    102008005800 A1    7/2009
DE    102008018133 A1    3/2010

(Continued)

OTHER PUBLICATIONS
ISA European Patent Office, Search Report of EP12155511.4, Aug. 6, 2012, Germany, 5 pages.

*Primary Examiner* — Stephen K Cronin
*Assistant Examiner* — George Jin
(74) *Attorney, Agent, or Firm* — Julia Voutyras; Alleman Hall McCoy Russell & Tuttle LLP (57) ABSTRACT

Methods are provided for controlling an engine. One method may include adjusting airflow to a turbocharger arrangement with a turbine bypass valve bypassing a first turbine from a high-pressure turbocharger and a wastegate bypassing a second turbine from a low-pressure turbocharger; responsive to valve degradation, setting the turbine bypass valve fully open and the wastegate fully closed; and limiting engine torque based on a flow through a compressor of the low pressure turbocharger. In the event of valve degradation, limiting torque may reduce overspeed and surge of the low pressure turbocharger.

14 Claims, 8 Drawing Sheets (51) Int. Cl.
  *F02D 41/00* (2006.01)
  *F02B 37/18* (2006.01)

(52) U.S. Cl.
  CPC .......... *F02D 41/0007* (2013.01); *F02D 41/182* (2013.01); *F02D 41/221* (2013.01); *F02D 2200/703* (2013.01); *F02D 2250/26* (2013.01); *Y02T 10/144* (2013.01)

(56) References Cited

U.S. PATENT DOCUMENTS

| | | | | |
|---|---|---|---|---|
| 6,155,050 A | * | 12/2000 | Blanz et al. | 60/603 |
| 6,655,141 B1 | * | 12/2003 | Faletti | 60/602 |
| 2007/0289302 A1 | * | 12/2007 | Funke et al. | 60/602 |
| 2011/0154892 A1 | * | 6/2011 | Ibuki et al. | 73/114.79 |
| 2012/0210710 A1 | * | 8/2012 | Chevalier et al. | 60/602 |
| 2012/0210711 A1 | * | 8/2012 | Petrovic et al. | 60/602 |
| 2013/0067914 A1 | * | 3/2013 | Malone et al. | 60/602 |
| 2013/0131953 A1 | * | 5/2013 | Luft et al. | 701/102 |

FOREIGN PATENT DOCUMENTS

| | | |
|---|---|---|
| EP | 2489850 A1 | 8/2012 |
| JP | 2010096050 A | 4/2010 |
| JP | 2010216402 A | 9/2010 |

* cited by examiner

METHOD FOR OPERATING AN INTERNAL COMBUSTION ENGINE WITH A TURBOCHARGER ARRANGEMENT AND CONTROL UNIT FOR AN ENGINE WITH A TURBOCHARGER ARRANGEMENT

CROSS REFERENCE TO RELATED APPLICATIONS

The present application claims priority to European Patent Application 12155511.4, filed on Feb. 15, 2012, the entire contents of which are hereby incorporated by reference for all purposes.

TECHNICAL FIELD

The present application relates to a method for operating an internal combustion engine equipped with a turbocharger arrangement and to a control unit for such an engine.

BACKGROUND AND SUMMARY

Internal combustion engines, in particular diesel and gasoline engines, are frequently equipped with turbochargers. A turbocharger operates by compression of the intake airflow into the engine in order to achieve more power. In particular, a predetermined power can be generated by a turbocharged engine with a smaller displacement volume and thus smaller size and less weight, thereby achieving an increased specific power and a reduction of fuel consumption. In general, turbochargers are driven by the exhaust flow of the internal combustion engine. To this end, a turbocharger comprises a turbine arranged in the exhaust flow of the internal combustion engine, driving a compressor for compressing the intake airflow of the engine via a connecting drive shaft.

Recently, in particular for in-line engines, series sequential turbocharging has become popular. A regulated two-stage turbocharging system comprises a low-pressure (LP) stage for peak power and a high-pressure (HP) stage for performance and for fulfilling the back pressure requirements for driving exhaust gas recirculation (EGR), which is needed for $NO_x$ pollutant emission reduction. Moreover, the HP turbine usually is smaller and more responsive than the LP turbine. The HP and LP turbines are arranged sequentially in the exhaust flow of the internal combustion engine, the LP turbine being located downstream of the HP turbine. The LP and HP compressors are arranged sequentially as well, the HP compressor being located in the intake airflow downstream of the LP compressor.

The exhaust flow and the intake airflow are controlled by one or more bypass valves located in branches of the exhaust or intake system respectively. The bypass valves are parallel to their respective turbine or compressor. In particular, the exhaust flow may be controlled by a bypass valve of the HP turbine (turbine bypass valve, TBV) and a wastegate (WG) for bypassing the LP turbine. With the bypass valve closed, the respective turbine is driven maximally, while with the bypass valve partially or fully opened, the parallel branch is passed by at least part of the exhaust flow, the respective turbine being driven at a reduced rate. Similarly, the intake airflow may be controlled by a compressor bypass valve of the HP compressor (CBV). The bypass valves ensure a smooth operation of the engine and also ensure respecting various further constraints, concerning for example exhaust composition, compressor outlet temperature and turbine inlet temperature, as well as avoiding turbocharger surge or overspeed.

The bypass valves may be controlled actively, for example, electrically or by vacuum, and may comprise a position feedback sensor. As the HP turbine bypass valve (TBV) is important in emissions control, it is usually actively controlled and equipped with a position feedback sensor. The LP turbine bypass valve (WG) usually also is actively operated. For high speeds and loads, the wastegate (WG) actuator normally is used as a boost pressure limiter, hence high levels of accuracy are not required and consequently no position feedback is required for the WG. The compressor bypass valve (CBV) may be equipped for active actuation with position feedback, but for reasons of cost and complexity reduction, it usually is passive with no position feedback, e.g. it opens or closes due to the pressure difference across it, and, in particular, has two possible positions, which are the fully open and the fully closed positions.

The active valves usually have a default or "failsafe" position into which they move when there is no vacuum or electrical supply. The failsafe position normally is either fully open or fully closed. The default setting is determined by factors such as safety and engine power requirements at altitude. In particular, with a vacuum or electrical supply error, the TBV is fully open, and the WG is fully closed, in order to ensure minimal damage to the HP compressor and some basic driveability. In that case, the LP turbocharger is used, since the HP turbine is effectively bypassed. With a suitable calibration, it may be possible to achieve low particle emission even in this case.

However, this is not sufficient to ensure avoidance of compressor surge or overspeed, since these events can occur at exhaust lambda values greater than 1.2 ($\lambda > 1.2$). In this case the valve actuators are inoperable and there is no effective boost pressure control for surge or overspeed protection. At altitude, this effect is more pronounced.

It is an object of the present disclosure to provide a method for operating an internal combustion engine equipped with a turbocharger arrangement, the method permitting increased turbocharger surge or overspeed protection in the case of turbocharger valve supply error. It is a further object of the disclosure to provide a control unit for an internal combustion engine with a turbocharger arrangement permitting increased turbocharger surge or overspeed protection in the case of such valve supply error.

A method of the present disclosure for operating an internal combustion engine refers to an internal combustion engine that is equipped with a turbocharger arrangement or turbocharger system comprising a low-pressure turbocharging stage and a high-pressure turbocharging stage, which are arranged sequentially. The low-pressure turbocharging stage comprises a low-pressure turbocharger which comprises a low-pressure turbine driving a low-pressure compressor. The high-pressure turbocharging stage comprises a high-pressure turbocharger, comprising, in particular, a high-pressure turbine driving a high-pressure compressor. The high-pressure compressor is arranged downstream of the low-pressure compressor in the intake airflow of the internal combustion engine. The low-pressure turbine is located downstream of the high-pressure turbine in the exhaust flow of the engine.

The turbocharger arrangement further comprises at least one turbocharger control valve for controlling the turbocharger arrangement. In particular, the low-pressure turbine may exhibit a low-pressure turbine bypass valve or wastegate (WG). The high-pressure turbine may exhibit a high-pressure turbine bypass valve (TBV). The at least one turbocharger control valve is configured to be actuated actively by a turbocharger valve supply system, which may comprise, for example, vacuum or electric transmission means. The at least one turbocharger control valve may be operated in a closed-loop control, employing the boost pressure for controlling the valve, for example.

The turbocharger arrangement may comprise further valves. Thus, for example, the high-pressure compressor may exhibit a compressor bypass valve (CBV). The CBV may be passive, e.g. operated by the pressure difference acting across it. The compressor bypass valve may be limited to two operational states, which are the fully open and the fully closed positions.

In accordance with the present disclosure it is determined whether the turbocharger valve supply system is in an operational state or in an error state. A supply system error, in particular an error of the electrical or vacuum system employed for actuating the at least one turbocharger control valve, may be detected by a diagnostic system in a standard engine control unit (ECU), which evaluates one or several sensor signals for detecting error modes. Additionally, an error of the turbocharger valve supply system may be detectable by a dedicated sensor system. An exemplary method for detecting an error mode of the wastegate, which may be indicative of a supply system error, is disclosed in EP 11155167.7, which is incorporated into the present application by reference.

According to a further aspect of the disclosure, a control unit for controlling a turbocharger arrangement of an internal combustion engine is configured to operate according to a method as described above. In particular, the control unit comprises at least one signal input port for capturing at least one sensor signal indicative of a turbocharger valve supply system error, or a diagnostic function for detecting a turbocharger valve supply system error based on other information available to the control unit. The control unit comprises at least one signal input port for capturing at least one sensor signal indicative of the low-pressure compressor flow, or is configured for determining the low-pressure compressor flow based on other information available. The control unit further comprises data processing means; the data processing means being configured for establishing a limit to an engine control parameter setpoint, depending on the low-pressure compressor flow. The processing means may be, in particular, configured for limiting fuel quantity or torque depending on the low-pressure compressor flow. The control unit may further comprise data storage means for storing a map or a lookup table, for example, employed in determining the limit to the engine control parameter. The control unit is further configured for feeding such modified control parameter setpoint to the engine control for controlling, for example, fuel quantity or torque according to the modified setpoint. The control unit may be, or may be part of, an electronic engine control unit (ECU).

Methods are provided for controlling an engine. One method may include adjusting airflow to a turbocharger arrangement with a turbine bypass valve bypassing a first turbine from a high-pressure turbocharger and a wastegate bypassing a second turbine from a low-pressure turbocharger; responsive to valve degradation, setting the turbine bypass valve fully open and the wastegate fully closed; and limiting engine torque based on a flow through a compressor of the low pressure turbocharger. In the event of valve degradation, limiting torque may prevent overspeed and surge of the low pressure turbocharger.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

The following detailed description describes a method and system for preventing turbocharger surge or overspeed in the event of turbocharger valve supply system error. In accordance with the present disclosure two sequential turbochargers are arranged in an engine. A high pressure turbine is arrange upstream of a low pressure turbine in an exhaust system with corresponding high pressure compressor arranged downstream of a low pressure compressor in an intake system. Air flow through the turbochargers is controlled by a compressor shut off valve (CBV) a turbine bypass valve (TBV) and a wastegate (WG). When a supply system providing energy to actuate the various valves fails the valves revert to their default state where the turbine bypass valve TBV is fully open and the waste gate is fully closed which effectively bypassed the high pressure turbocharger, allowing the low pressure turbocharger to supply boost for basic driveability. The system and methods below describe actions taken to minimize overspeed and surge of the low pressure turbocharger which may damage turbocharger components as well as have negative effects on driving conditions.

Figure 1:
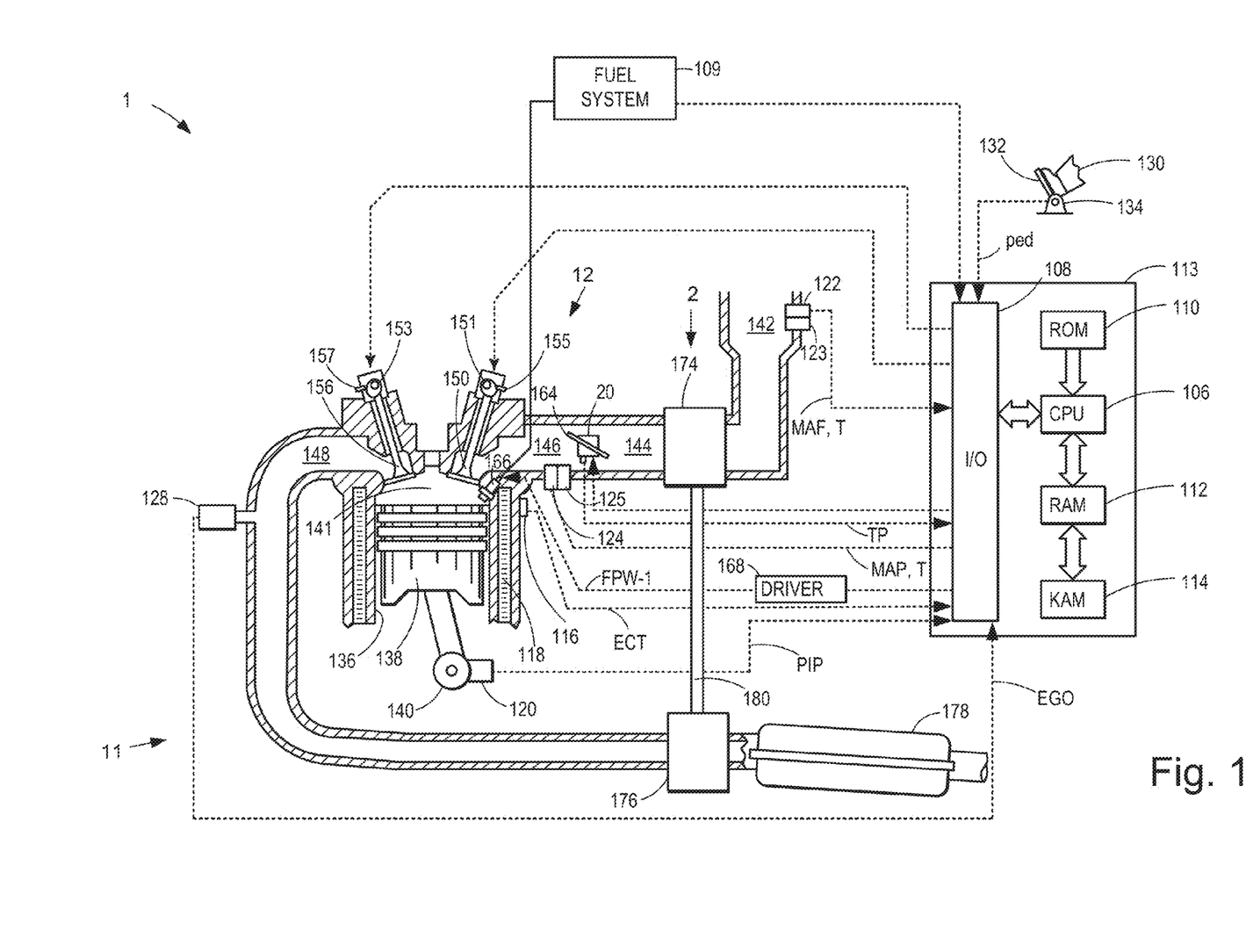
FIG. 1 shows an example cylinder of an internal combustion engine.

Referring now to the figures, FIG. 1 depicts an example embodiment of a combustion chamber or cylinder of internal combustion engine 1. Engine 1 may receive control parameters from a control system including controller 113 and input from a vehicle operator 130 via an input device 132. In this example, input device 132 includes an accelerator pedal and a pedal position sensor 134 for generating a proportional pedal position signal PP. Cylinder (herein also "combustion chamber') 141 of engine 1 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 1.

Cylinder 141 can receive intake air via a series of intake air passages 142, 144, and 146. Intake air passage 146 may communicate with other cylinders of engine 1 in addition to cylinder 141. FIG. 1 shows engine 1 configured with a multi-stage turbocharger arrangement 2 depicted schematically and shown in greater detail in FIG. 2. The multi-stage turbocharger arrangement 2 comprises a high pressure turbocharger and low pressure turbocharger including compressors 174 arranged between intake passages 142 and 144 of intake system 12, and an exhaust turbines 176 arranged along exhaust passage 148 in exhaust system 11. Compressors 174 may be at least partially powered by exhaust turbines 176 via shafts 180 where the boosting device is configured as a turbocharger.

The turbocharger system of the present disclosure comprises a low-pressure turbocharging stage and a high-pressure turbocharging stage, which are arranged sequentially. The low-pressure turbocharging stage comprises a low-pressure turbocharger which comprises a low-pressure turbine driving a low-pressure compressor. The high-pressure turbocharging stage comprises a high-pressure turbocharger, comprising, in particular, a high-pressure turbine driving a high-pressure compressor. The high-pressure compressor is arranged downstream of the low-pressure compressor in the intake airflow of the internal combustion engine. The low-pressure turbine is located downstream of the high-pressure turbine in the exhaust flow of the engine. Turbocharger arrangement 2 is shown in greater detail with reference to FIG. 2 below.

The intake passage 142 and 144 further include a throttle 20 including a throttle plate 164 may be provided along an intake passage of the engine for varying the flow rate and/or pressure of intake air provided to the engine cylinders. For example, throttle 20 may be disposed downstream of compressors 174 as shown in FIG. 1, or alternatively may be provided upstream of compressors 174.

Exhaust passage 148 may receive exhaust gases from other cylinders of engine 1 in addition to cylinder 141. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 1 may include one or more intake valves and one or more exhaust valves. For example, cylinder 141 is shown including at least one intake poppet valve 150 and at least one exhaust poppet valve 156 located at an upper region of cylinder 141. In some embodiments, each cylinder of engine 1, including cylinder 141, may include at least two intake poppet valves and at least two exhaust poppet valves located at an upper region of the cylinder.

Intake valve 150 may be controlled by controller 113 by cam actuation via cam actuation system 151. Similarly, exhaust valve 156 may be controlled by controller 113 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 113 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 141 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Cylinder 141 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Engine 1 is depicted as an auto ignition system. However, in some embodiments, each cylinder of engine 1 may include a spark plug for initiating combustion. An ignition system can provide an ignition spark to combustion chamber via spark plug in response to a spark advance signal from controller 113, under select operating modes.

As a non-limiting example, cylinder 141 is shown including one fuel injector 166. Fuel injector 166 is shown coupled directly to cylinder 141 for injecting fuel directly therein in proportion to the pulse width of signal FPW received from controller 113 via electronic driver 168. In this manner, fuel injector 166 provides what is known as direct injection (hereafter also referred to as "DI") of fuel into combustion cylinder 141. While FIG. 1 shows injector 166 as a side injector, it may also be located overhead of the piston. Fuel may be delivered to fuel injector 166 from a high pressure fuel system 109 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 113. It will be appreciated that, in an alternate embodiment, injector 166 may be a port injector providing fuel into the intake port upstream of cylinder 141.

As described above, FIG. 1 shows one cylinder of a multi-cylinder engine. As such each cylinder may similarly include its own set of intake/exhaust valves, fuel injector(s), etc.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may increase engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 113 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 113 may receive various signals from sensors coupled to engine 1, in addition to those signals previously discussed, including measurement of inducted mass air flow (MAF) from mass air flow sensor 122; temperature (T) from inlet temperature sensor 123; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124; temperature (T) from intake temperatures sensor 125; or from additional sensor 19 (shown in FIG. 2). Engine speed signal, RPM, may be generated by controller 113 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

Figure 2:
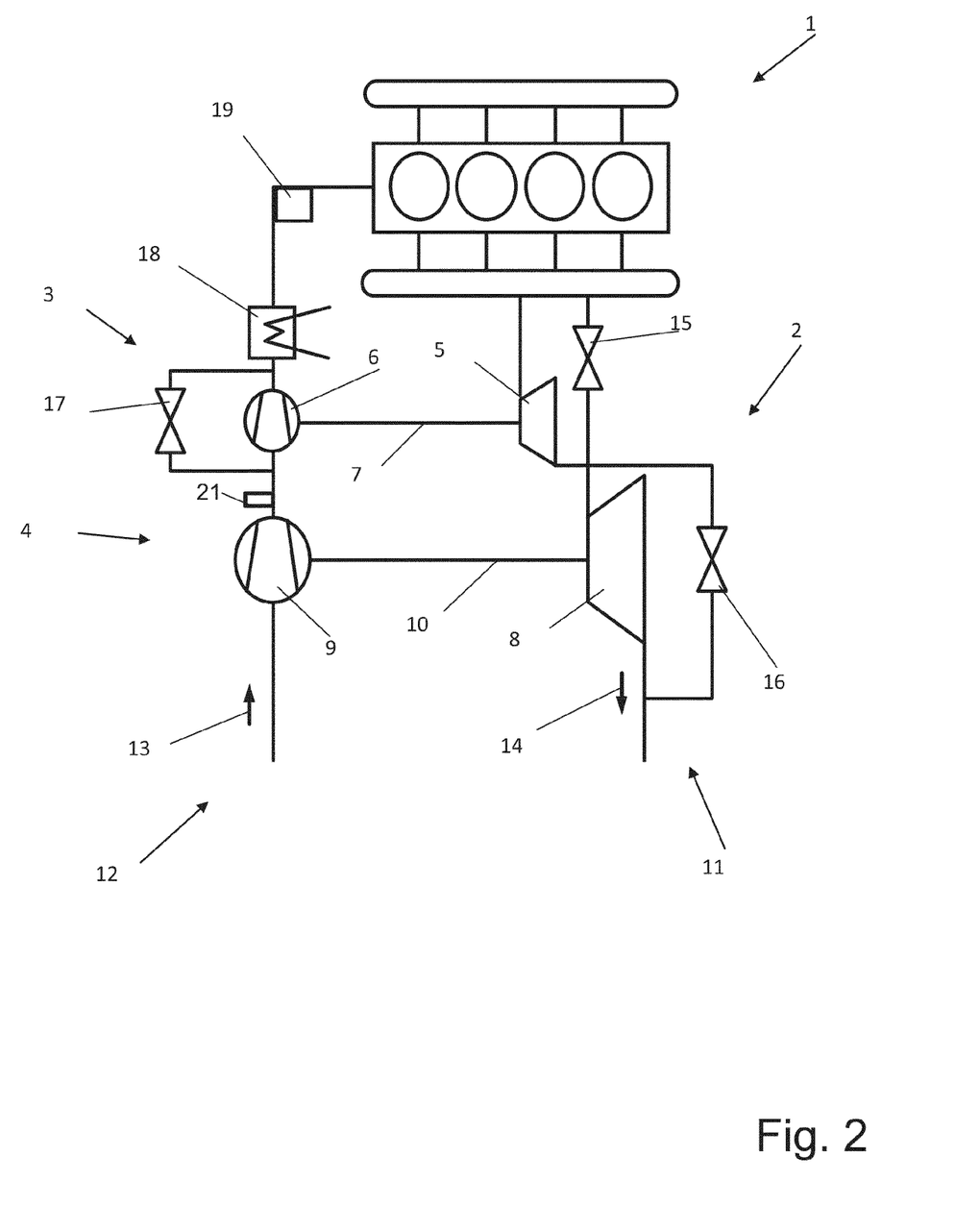
FIG. 2 shows a simplified block diagram of an internal combustion engine with a series sequential turbocharger arrangement.

Shown in FIG. 2 is an internal combustion engine 1 with turbocharger arrangement 2 shown in greater detail. Engine 1 of FIG. 2 is substantially the same as the engine 1 shown in FIG. 1 with like reference numerals for like components. Engine 1 exhibits a turbocharger arrangement 2 or turbocharger system comprising a high-pressure turbocharger 3 and a low-pressure turbocharger 4. The high-pressure turbocharger 3 comprises a high-pressure turbine 5 and a high-pressure compressor 6, the high-pressure compressor 6 being driven by the high-pressure turbine 5 via a drive shaft 7. The low-pressure turbocharger 4 comprises a low-pressure turbine 8 driving a low-pressure compressor 9 by means of a drive shaft 10. The turbines 5, 8 are arranged sequentially in the exhaust system 11 of the internal combustion engine 1, the high-pressure turbine 5 being arranged upstream the low-pressure turbine 8, e.g. in a section with higher pressure. Correspondingly, the compressors 6 and 9 are arranged sequentially in the intake system 12 of the engine 1, the high-pressure compressor 6 being located downstream the low-pressure compressor 9. The direction of airflow in the intake system 12 and the direction of exhaust flow in the exhaust system 11 are indicated by the arrows 13 and 14, respectively. Generally, the high-pressure turbine 5 and the high-pressure compressor 6 are smaller than the low-pressure turbine 8 and the low-pressure compressor 9, respectively. An intercooler 18 is included downstream the HP compressor, which is indicated symbolically in FIG. 1.

A high-pressure turbine bypass valve 15 (TBV) is arranged in a parallel branch of the exhaust system parallel to the high-pressure turbine 5. Therefore, a full or partial opening of the high-pressure turbine bypass valve 15 creates a bypass for the exhaust flow to partially or completely bypass the high-pressure turbine 5. If the exhaust flow partially or completely passes through the bypass valve 15, the high-pressure turbine 5 is consequently driven at a reduced rate. The operation of the high-pressure turbocharger 3 can thus be controlled by the operation of the TBV 15. For this purpose, the TBV 15 is actively controlled, serving as an actuator in the turbocharger arrangement 2, by an electrical or vacuum valve supply system (not shown). In a similar manner, a low-pressure turbine waste-gate 16 (WG) is arranged in a parallel branch of the exhaust system 11 parallel to the low-pressure turbine 8. The WG 16 is also actively operated, serving as an actuator, by an electrical or vacuum valve supply system (not shown). Active control of valves within turbocharger arrangement 2 is achieved via engine controller 113 (shown in FIG. 1).

In the intake system 12, the intake air flows through the low-pressure compressor 9, being compressed in a first stage of compression. Thereafter, the intake air flows through the high-pressure compressor 6 representing a second stage of compression, or through a parallel branch arranged parallel to the high-pressure compressor 6. The parallel branch can be opened or closed by a compressor bypass valve 17 (CBV). The CBV 17 is passive, e.g. operated by the pressure difference acting across it.

One or several flow and/or pressure sensors may be located in the intake system 12, a sensor 19 being indicated symbolically in FIG. 2, sensor 19 provides input to engine controller 113 (shown in FIG. 1). The boost pressure, which is provided by the turbocharger arrangement 2 and which is fed into the internal combustion engine, may be measured roughly at the same position. The engine 1 may be also equipped with an exhaust gas recirculation (not shown).

In normal operation, the turbocharger arrangement 2 is operated according to the engine speed and/or torque. At low engine speed and/or torque, the WG 16 is set to the fully closed position, and the TBV 15 is employed for controlling the boost pressure of the turbocharger arrangement 2, preferably in a closed-loop control, according to an engine operation point. Due to the pressure difference acting, the CBV 17 is forced into the fully closed position. In this way, optimal performance in the low-speed/torque domain can be provided, as well as the back pressure required for exhaust gas recirculation. At higher engine speed and/or torque, the TBV 15 is set to the fully open position, and the WG 16 is employed for controlling the boost pressure of the turbocharger arrangement 2, preferably in a closed-loop control employing the boost pressure. The CBV 17 moves into the fully open position. In this way, peak power can be provided. Alternatively, depending on the current engine speed and/or load and the current position of the CBV 17, both of the low-pressure and the high-pressure turbine valves 15 and 16 can be set simultaneously to optimal positions, which may both be intermediate positions between fully closed and fully opened. This means that closed-loop control employing both, the low-pressure and the high-pressure turbine valves is performed.

The valves 15 and 16 have a failsafe position to which they move when the supply system fails. Such default setting is, in the example shown, the TBV 15 being fully open, and the WG 16 being fully closed. Thus, in case of vacuum or electrical valve supply error, the high-pressure turbine 5 is bypassed, the high-pressure compressor not being driven by the exhaust. The low-pressure turbine 8 and thus the low-pressure compressor 9 is driven by the entire exhaust in that case, which provides advantages for maximizing engine power and minimizing particle emission, however bears the risk of turbocharger surge or overspeed. A sensor for directly detecting an error of the vacuum or electric supply system of the valves 15, 16 may be provided (not shown). In other embodiments valve supply error (also referred to herein as valve degradation) may be detected or inferred based on inputs by other sensors within engine. As a non limiting example, input from MAP sensor 124 to controller 113 may indicate vacuum error in instances where vacuum boost is used to control the valves 15 and 16.

If an error of the turbocharger valve supply system is detected, a low-pressure compressor flow is determined. The intake airway of the engine may be equipped with a flow sensor for measuring the low-pressure compressor flow. The flow sensor 21 may be located, for example, directly downstream of the low pressure compressor. The low-pressure compressor flow may be determined as well, however, based on any other single or multiplicity of sensor signals representative of intake mass airflow which may include MAP sensor 124 (shown in FIG. 1). The low-pressure compressor flow may be measured after a supply system error has been detected or may be monitored continuously.

According to the present disclosure, an engine control parameter setpoint is limited, the limit depending on the low-pressure compressor flow as determined by a flow sensor. The control parameter subject to the modified setpoint is employed for controlling the engine.

By limiting an engine control parameter setpoint, the limit depending on the low-pressure compressor flow, it can be ensured that turbocharger surge or overspeed, in particular of the low-pressure turbocharger, is avoided. Moreover, in spite of valve system supply error, least interference with engine control and optimal power, drivability and emissions control can be achieved.

According to a preferred embodiment of the disclosure, the engine parameter that is limited depending on the low-pressure compressor flow is the quantity of fuel provided to the engine per time unit, in particular the fuel quantity injected per time unit. The fuel quantity is controllable by the driver by pressing the accelerator pedal. Thus, in general, the fuel quantity depends on the pedal position, however, according to the disclosure the fuel quantity preferably is subject to an additional limitation depending on the low-pressure compressor flow. In this way, turbocharger surge or overspeed protection can be achieved in a particularly simple and cost-effective manner.

Preferably, the fuel quantity setpoint is limited by imposing an offset to the fuel quantity injected, the offset being controlled in a closed loop. In particular, the offset may be controlled depending on the low-pressure compressor pressure ratio.

Alternatively or additionally, the engine torque may be limited depending on the low-pressure compressor flow. The torque produced by the engine generally is controllable by the driver by pressing the accelerator pedal; however, according to the disclosure it may be limited depending on low-pressure compressor flow. In this way, turbocharger surge or overspeed can also be avoided in a particularly simple and cost-effective manner.

The term "setpoint" as employed in the present disclosure does not necessarily imply the presence of an underlying control loop. In particular, injected fuel quantity or torque need not be measured, although there might be as well a corresponding measurement fed into a control loop. Thus, for example, the driver input via the pedal may be considered a torque request which is filtered and limited, or augmented in some way for various reasons, e.g. for engine overheating protection or vehicle dynamics torque interventions. At the end of this procedure, a torque setpoint results, which may be subject to a further limitation according to the present disclosure. The torque setpoint may be converted into a fuel quantity request that is passed to the fuel injector drivers. Such fuel setpoint may be limited according to the disclosure as well.

According to a preferred embodiment of the disclosure, the engine control parameter is limited when the low-pressure compressor flow is in a predetermined range, the predetermined range representing, in particular, low-pressure compressor flow values at or near surge or overspeed condition. As outside that range there is no risk of surge or overspeed, the engine control parameter need not be modified even in case of turbocharger valve supply system error. Thus, surge or overspeed protection can be achieved without affecting engine operation, when conditions are not critical.

Most preferably, the limit imposed on the engine control parameter, for example the fuel quantity or torque limit, depends on ambient conditions, in particular on ambient pressure. As surge or overspeed are more likely to occur at high altitude, in this way a particularly effective surge or overspeed protection can be provided.

Figure 3:
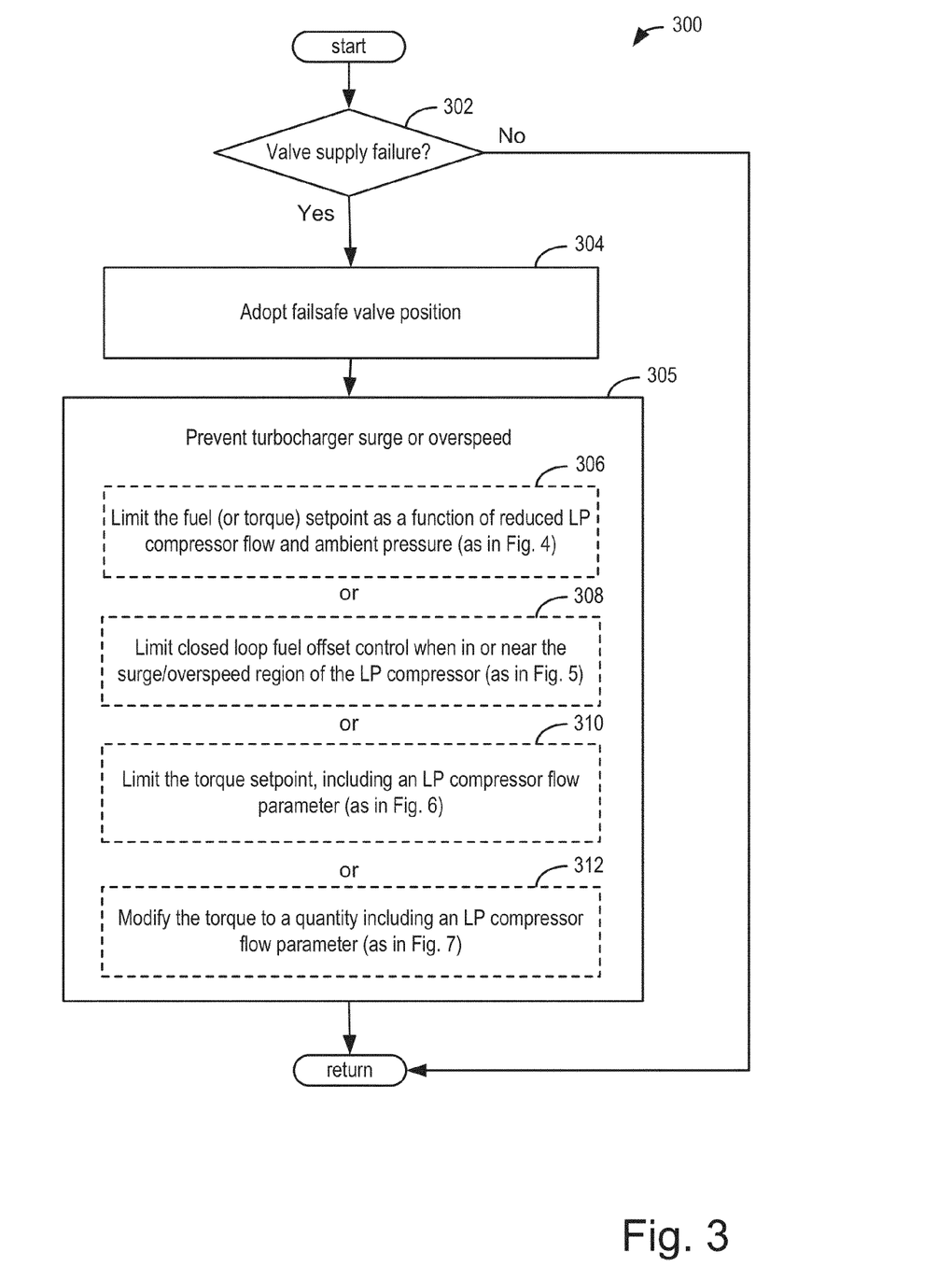
FIG. 3 is a simplified diagram of a method for preventing surge or overspeed in a low-pressure compressor during valve supply system error.

FIG. 3 provides a diagram of an overall method 300 to prevent surge or overspeed of the low pressure turbocharger. Method 300 starts at 302 where it is determined if there is a valve supply error. If there is not a valve supply error (No) the method then returns. If there is a valve supply error (Yes) the failsafe valve position is adopted at 304. In the failsafe position, the TBV is fully opened and the WG is fully closed. This valve positioning bypasses the high pressure turbocharger and the low pressure turbocharger is used. The method 300 then proceeds to 305 where actions to prevent overspeed and surge of the low pressure turbocharger which are taken.

At 305, four embodiments of the method to limit fuel or torque to limit to prevent turbocharger overspeed or surge are presented. At 306, the fuel (or torque) setpoint is limited as a function of reduced LP compressor flow and ambient pressure. This embodiment of method 300 is described in greater detail with reference to FIG. 4. At 308, closed loop fuel offset control is limited when in or near the surge/overspeed region of the LP compressor (as further described in reference to FIG. 5). At 310, the torque setpoint is limited based on the inclusion of a low pressure compressor flow parameter (as further described in reference to FIG. 6). At 312, torque is modified to a quantity including an LP compressor flow parameter (as further described in reference to FIG. 7). The method then returns. The method of 300 shown in FIG. 3 provides a high level schematic for controlling turbocharger surge and overspeed and details on individual embodiments of the method 300 are described are described herein. Application of a specific embodiment may be based on the availability of sensors, data, calibration requirements and the relative complexity of applying an embodiment.

Figure 4:
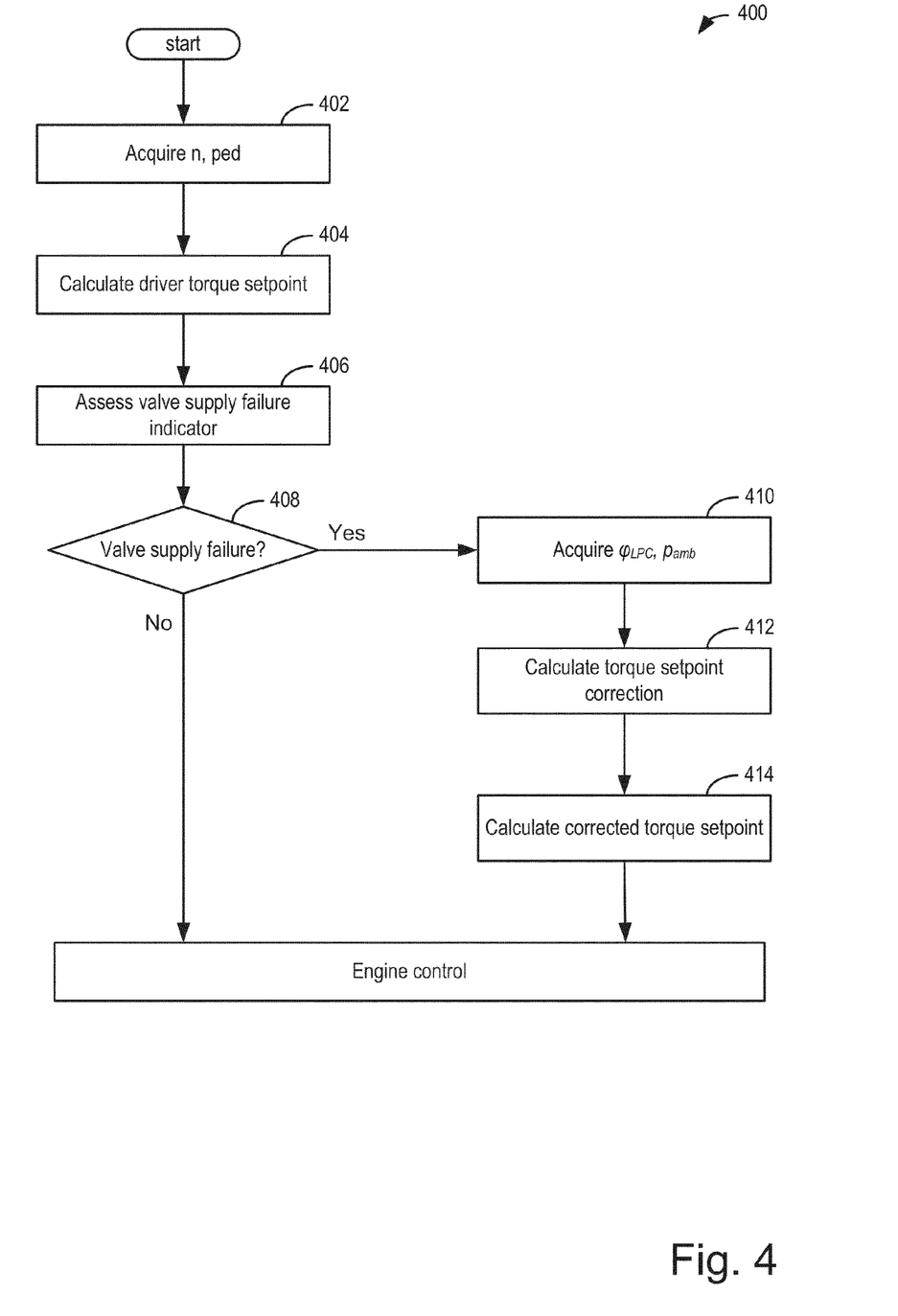
FIG. 4 is a simplified flow diagram of a method for limiting a fuel setpoint.

In FIG. 4, a method 400 for evaluating and responding to valve degradation according to a first embodiment of the disclosure is shown. The method 400 provides details for limiting the fuel (or torque) setpoint as a function of reduced low pressure compressor flow and ambient pressure as shown at 306 (in FIG. 3).

At 402, the engine speed n and the accelerator pedal position ped are acquired. Ped position ped is conveyed to engine controller 113 from pedal position sensor 134. Engine speed $n_{is}$ determined by engine controller 113 in response to input PIP from hall effect sensor 120. At 404 these values are employed for establishing a nominal torque of the engine, e.g. a driver-determined torque setpoint. At 406 a valve supply error indicator is assessed. If at 408 no turbocharger supply system error has been detected (No), the driver-determined torque setpoint (calculated at 404), which is a function of n and ped (values acquired at 402), is fed to the engine controller 113 for controlling the torque actually provided by the engine, for example by controlling the fuel injection parameters accordingly.

If, however, an error of the valve supply system has been detected (Yes at 408), the corrected low-pressure compressor flow $\phi_{LPC}$ and the ambient pressure $p_{amb}$ are acquired at 410. The ambient pressure $p_{amb}$ may be indicated to engine controller 113 by mass air flow sensor 122. Calculation corrected low-pressure compressor flow $\phi_{LPC}$ is described below. At 412, these values are employed for calculating a torque setpoint correction value. At 414 the torque setpoint correction value is used for modifying the driver-determined torque setpoint to obtain a corrected torque setpoint. The correction value is chosen to limit to torque setpoint such that turbocharger surge or overspeed is safely avoided.

Effectively, the torque request is reduced as a function of ambient pressure $p_{amb}$ and corrected low-pressure compressor flow $\phi_{LPC}$. The ambient pressure $p_{amb}$ mainly is due to altitude. The corrected low-pressure compressor flow $\phi_{LPC}$ can be determined from the total flow, e.g. fuel plus air flow, corrected in terms of temperature and pressure such that it is calculated as the total flow multiplied by the square root of a value with a numerator being a fraction of an inlet temperature to a reference temperature and the denominator being the fraction of an inlet pressure to a reference pressure. For example, the corrected low-pressure compressor flow $\phi_{LPC}$ may be calculated by $$\phi_{LPC} = (\text{total flow}) * \text{sqrt}(T_{inlet}/T_{ref})/(p_{inlet}/p_{ref}),$$

where $T_{inlet}$ and $T_{ref}$ are inlet and reference temperatures, and $p_{inlet}$ and $p_{ref}$ are inlet and reference pressures, respectively. The values $T_{inlet}$ may be measured by inlet temperature sensor 123 adjacent to mass air flow sensor 122. The reference temperature $t_{ref}$ may be measured by intake temperature sensor 125 adjacent to manifold absolute pressure sensor 124. $P_{inlet}$ and $p_{ref}$ may be calculated by engine controller 113 based on inputs MAF from mass air flow sensor 122 and MAP from manifold absolute pressure sensor 124 respectively. Values are imputed to and setpoints calculated by the engine controller 113. Thus, the fuel injection parameters are controlled such surge or overspeed is prevented.

Figure 5:
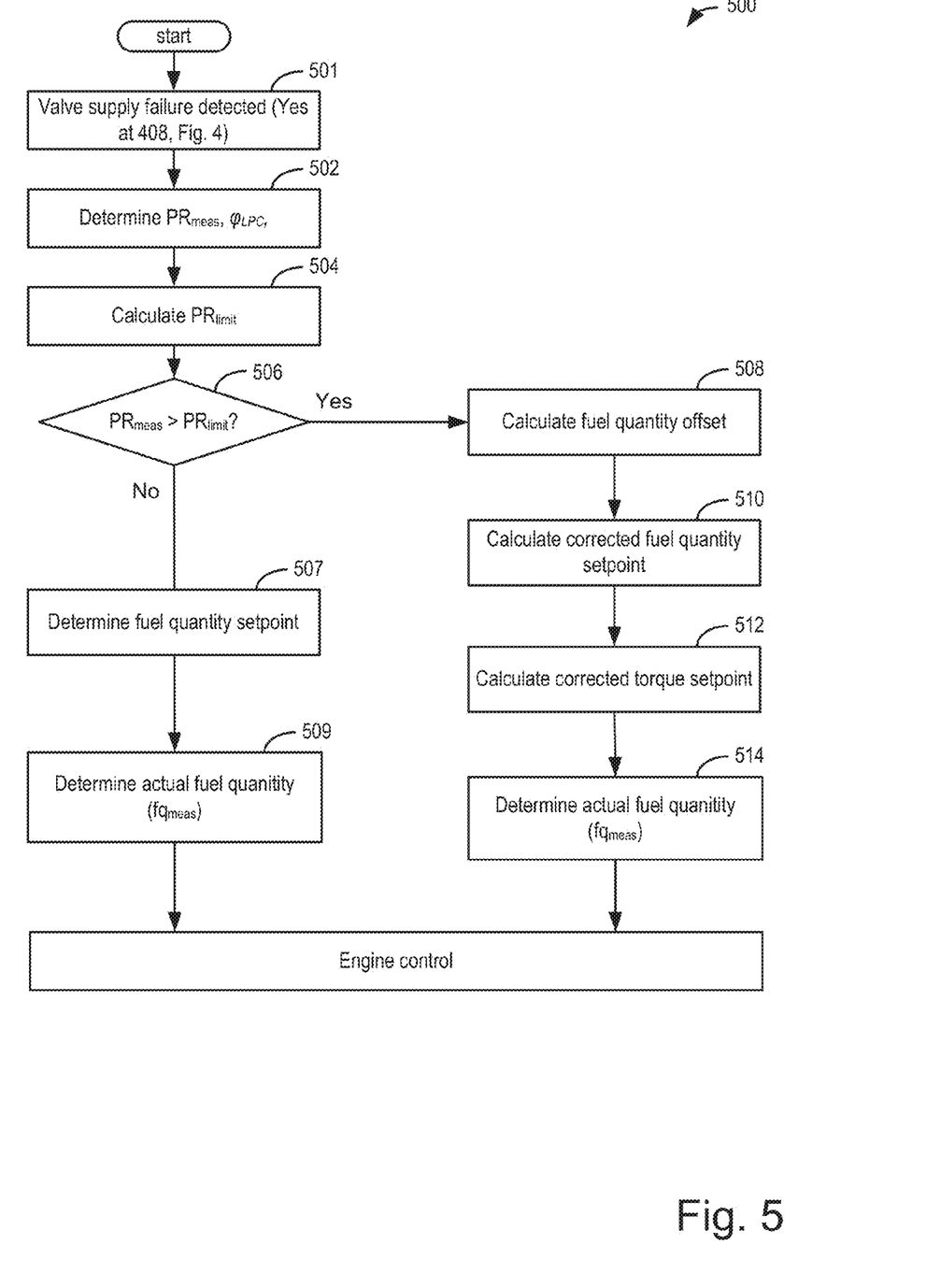
FIG. 5 is a simplified flow diagram of a method for limiting fuel offset control.

FIG. 5 shows a second embodiment comprising method 500, a closed-loop fuel modification based on pressure ratio control. The method 500 starts at 501 where a turbocharger valve supply system error has been detected, corresponding to a Yes at 408 in FIG. 4.

At 502 the pressure ratio $PR_{meas}$ in the air intake system is measured, which in the case of valve error in particular is the ratio between the downstream and the upstream pressures of the low-pressure compressor. The pressure ratio may be determined by engine controller 113 based on the pressure downstream of the low pressure compressor 9 as indicated by flow sensor 21 and the pressure upstream of the low pressure compressor 9 as indicated by mass air flow sensor 122. At 502, the pressure ratio in the intake airway ($PR_{meas}$) is measured and the corrected low-pressure compressor flow $\phi_{LPC}$ is determined. Depending on the values of the pressure ratio $PR_{meas}$ and the corrected low-pressure compressor flow $\phi_{LPC}$, a limiting pressure ratio $PR_{limit}$ is calculated at 504 according to a pre-determined map, such as that shown in FIG. 6.

At 506, the limiting pressure ratio $PR_{limit}$ is compared to the measured pressure ratio $PR_{meas}$. If $PR_{meas}$ does not exceed $PR_{limit}$ (No), the method proceeds to 507 where a fuel quantity setpoint is determined. This fuel quantity setput is fed to the engine control along with the actual fuel quantity $fq_{meas}$ at 509. In this case, the low-pressure compressor is far enough from surge or overspeed conditions, so that effectively no fuel quantity limitation is required.

On the other hand, if, at 506, $PR_{meas}$ exceeds $PR_{limit}$ (Yes), a fuel quantity offset is calculated at 508. At 510, the calculated fuel quantity offset is employed for calculating a corrected fuel quantity setpoint which is limited to avoid turbocharger surge or overspeed. The offset is calculated by using a pressure ratio setpoint that is within the hysteresis band of a pre-determined map (see FIG. 6). Thus, by adding a controlled, negative fuel offset, the compressor pressure ratio can be kept within the $PR_{limit}$ threshold. There may be a maximum fuel quantity offset to be added, which cannot be exceeded. At 512, the corrected torque setpoint is calculated. At 514 the actual fuel quantity ($fq_{meas}$) is determined and sent to the engine controller with the corrected fuel quantity setpoint. The corrected fuel quantity setpoint is employed by the engine control, including the measured fuel quantity $fq_{meas}$ for closed-loop control.

Figure 6:
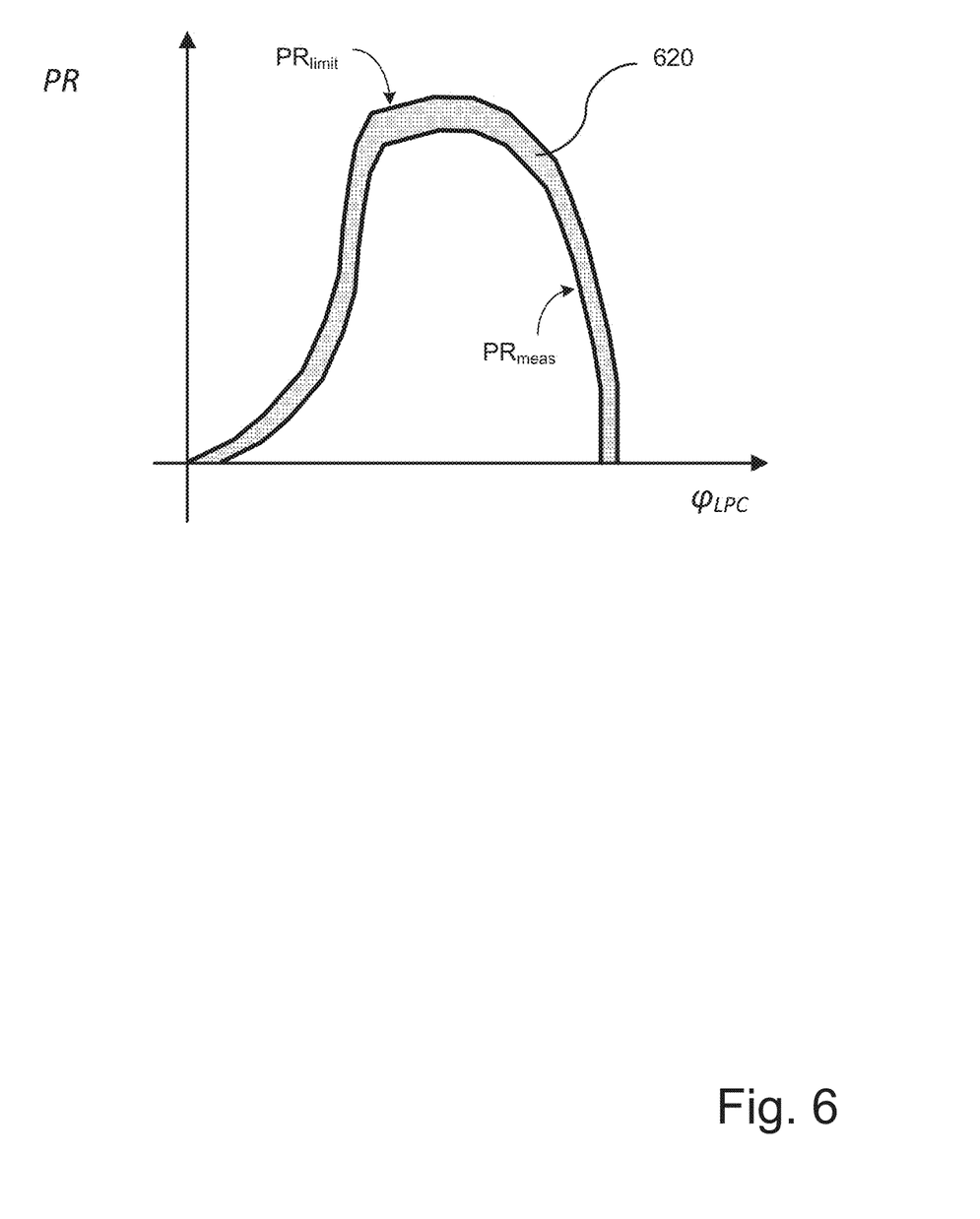
FIG. 6 shows an exemplary relationship between low-pressure compressor flow and pressure ratio.

FIG. 6 shows a typical compressor map according to which the limiting pressure ratio $PR_{limit}$ is determined. The map comprises a hysteresis band 620 for real-time implementation. The lower curve represents the measured $PR_{meas}$, while the upper curve represents the limiting pressure ratio $PR_{limit}$. The object of method 500 (of FIG. 5) is to maintain the measured pressure ratio $PR_{meas}$ below limiting pressure ratio $PR_{limit}$, to prevent turbocharger overspeed and surge, thus protecting the integrity of the turbocharger components.

Figure 7:
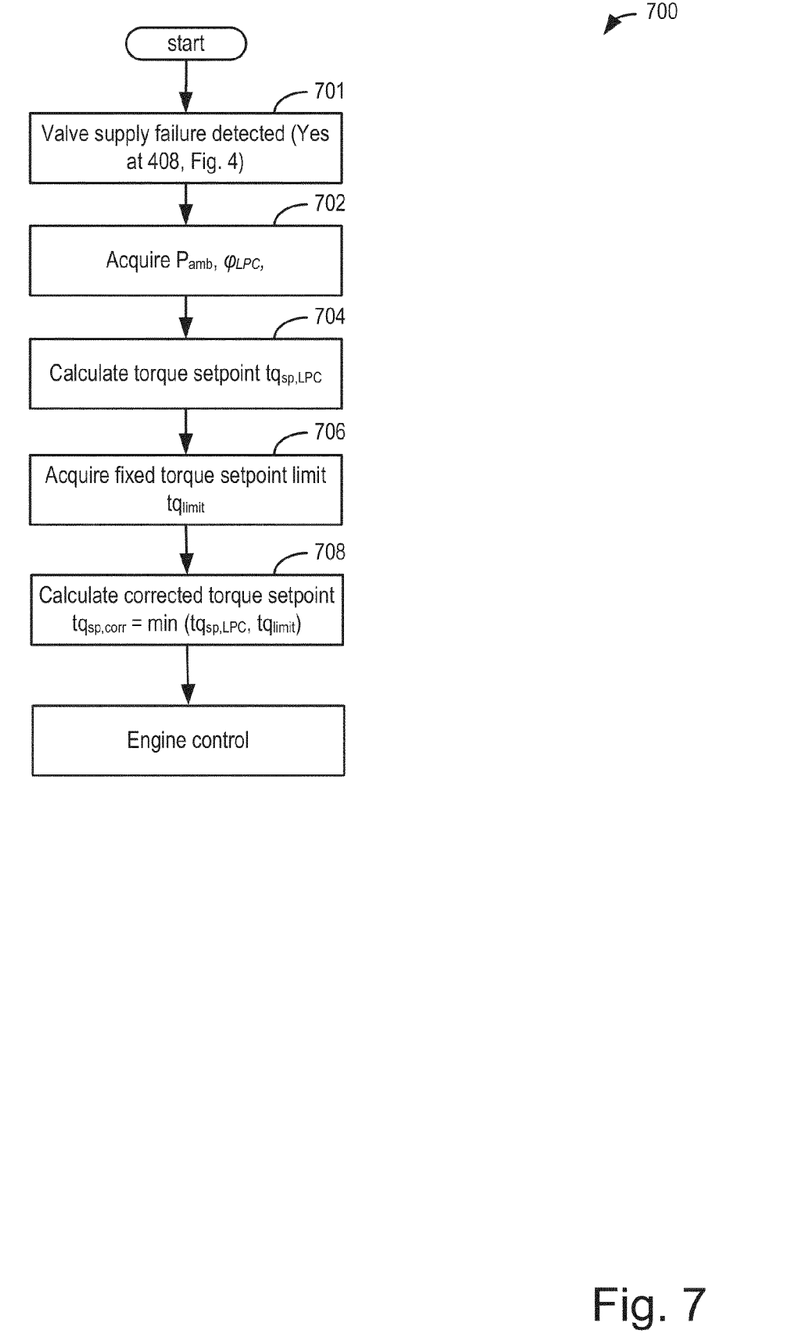
FIG. 7 is a simplified flow diagram of a method for limiting a torque setpoint.

A third embodiment of the disclosure is shown in FIG. 7. The method 700 also corresponds to the lower-right branch in FIG. 4, and starts at 701 where a turbocharger valve supply system error has been detected (yes at 408). According to the method 700, a limiting torque curve is based on the corrected low-pressure compressor flow $\phi_{LPC}$ and the ambient pressure $p_{amb}$. $p_{amb}$ and $\phi_{LPC}$ are acquired at 702. The torque setpoint ($tq_{sp,LPC}$) is calculated based on $p_{amb}$ and $\phi_{LPC}$ at 704. At 706, the fixed torque setpoint limit ($tq_{limit}$) is acquired. At 708, the corrected torque setpoint ($tq_{sp,corr}$) is calculated. The corrected torque setpoint ($tq_{sp,corr}$) is a minimum function depending on the torque setpoint $tq_{sp,LPC}$ and a fixed torque setpoint limit $tq_{limit}$. The calculated corrected torque setpoint ($tq_{sp,corr}$) is sent to the engine control so that the permissible torque threshold is not exceeded.

Figure 8:
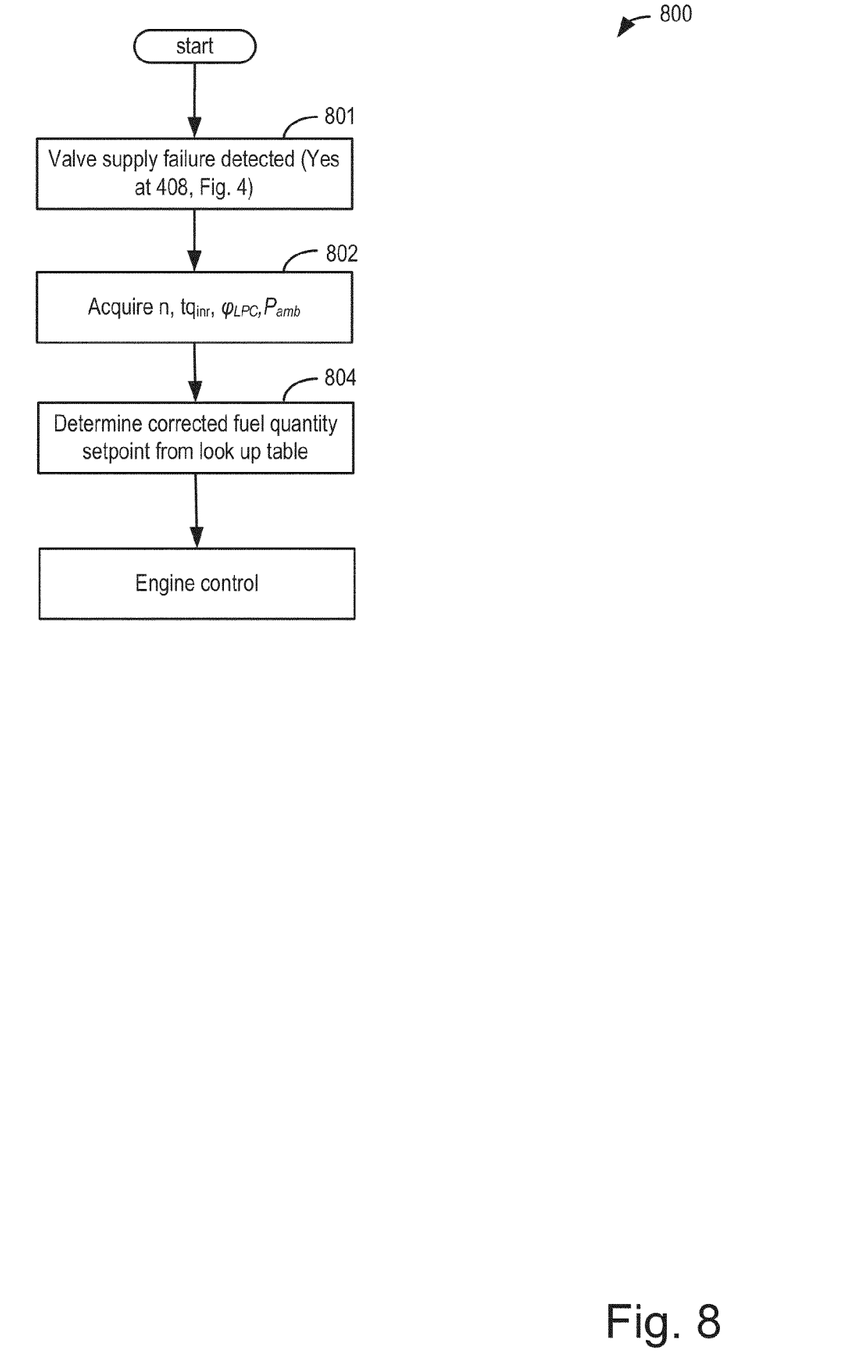
FIG. 8 is a simplified flow diagram of a method for modifying a torque quantity.

A fourth embodiment of the disclosure is shown in FIG. 8. The method 800 corresponds to the case that a turbocharger valve supply system error has been detected (lower right branch in FIG. 4). The method 800 starts at 801 where a turbocharger valve supply system error has been detected (yes at 408). At 802, the engine speed n, a desired inner torque $tq_{inr}$, the corrected low-pressure compressor flow $\phi_{LPC}$, and the ambient pressure $p_{amb}$ are acquired. The inner torque $tq_{inr}$ is the torque due to combustion, excluding losses by pumping, friction, accessory loads, etc. Shortly speaking, thus the torque-to-quantity map is modified including the low-pressure flow and the ambient pressure. At 804 using the values n, $tq_{inr}$, $\phi_{LPC}$, and $p_{amb}$ in reference to consulting a 4-dimensional lookup table a corrected fuel quantity setpoint can be determined directly. The 4-dimensional lookup table or map may depend on the engine operating mode, thus different lookup tables or maps may be employed in normal engine operation, in diesel particle filter regeneration mode, in $NO_x$ aftertreatment mode, etc.

In any of the examples shown, safe protection against turbocharger surge or overspeed may be achieved.

Methods are provided for controlling an engine. One method may include adjusting airflow to a turbocharger arrangement with a turbine bypass valve bypassing a first turbine from a high-pressure turbocharger and a wastegate bypassing a second turbine from a low-pressure turbocharger; responsive to valve degradation, setting the turbine bypass valve fully open and the wastegate fully closed; and limiting engine torque based on a flow through a compressor of the low pressure turbocharger. In the event of valve degradation, limiting torque may prevent overspeed and surge of the low pressure turbocharger.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an internal combustion engine, comprising:
a turbocharger arrangement comprising a low-pressure and a high-pressure stage arranged sequentially, the low-pressure stage comprising a low-pressure compressor, and a turbine bypass valve and wastegate each actuated by a supply system; and
an engine controller configured for:
detecting degradation in the supply system,
responsive to the detection of degradation in the supply system, setting the turbine bypass valve fully open and the wastegate fully closed,
determining a low-pressure compressor flow, and
limiting an engine control parameter setpoint depending on the low-pressure compressor flow.

2. A method, comprising:
adjusting airflow to a turbocharger arrangement with a turbine bypass valve bypassing a first turbine from a high-pressure turbocharger and a wastegate bypassing a second turbine from a low-pressure turbocharger;
responsive to one or more of wastegate and turbine bypass valve degradation, setting the turbine bypass valve fully open and the wastegate fully closed; and
limiting engine torque based on a flow through a compressor of the low-pressure turbocharger.

3. The method of claim 2, wherein the one or more of wastegate and turbine bypass valve degradation is an electrical error.

4. The method of claim 2, wherein the one or more of wastegate and turbine bypass valve degradation is a loss of vacuum boost.

5. The method of claim 2, wherein the flow through the compressor of the low-pressure turbocharger is detected by a flow sensor located directly downstream of the compressor of the low-pressure turbocharger.

6. The method of claim 2, wherein limiting engine torque based on the flow through the compressor of the low-pressure turbocharger further comprises limiting fuel to an engine.

7. The method of claim 2, wherein limiting torque based on the flow through the compressor of the low-pressure turbocharger is based on ambient pressure and a corrected low-pressure compressor flow.

8. The method of claim 7, wherein the corrected low-pressure compressor flow is calculated as a total flow multiplied by the square root of a value with a numerator being a fraction of an inlet temperature to a reference temperature and the denominator being the fraction of an inlet pressure to a reference pressure.

9. The method of claim 2, wherein limiting torque based on the flow through the compressor of the low-pressure turbocharger further comprises limiting torque such that a measured pressure ratio does not exceed a pressure ratio limit, wherein the pressure ratio is a ratio of a pressure downstream of the compressor of the low-pressure turbocharger to a pressure upstream of the compressor of the low-pressure turbocharger.

10. The method of claim 9, wherein the pressure ratio limit is determined with reference to a pre-determined map.

11. The method of claim 2, wherein limiting torque based on the flow through the compressor of the low-pressure turbocharger further comprises limiting torque to a corrected torque setpoint, wherein the corrected torque setpoint is calculated from a corrected low-pressure compressor flow and an ambient pressure.

12. The method of claim 2, wherein limiting torque based on the flow through the compressor of the low-pressure turbocharger further comprises determining a fuel quantity setpoint based on an engine speed, a desired inner torque, a corrected low-pressure compressor flow, and an ambient pressure, wherein the inner torque is torque due to combustion.

13. The method of claim 12, wherein determining the fuel quantity setpoint further comprises consulting a lookup table.

14. The method of claim 2, wherein the high-pressure turbocharger is smaller than the low-pressure turbocharger.

* * * * *